Figure 1:
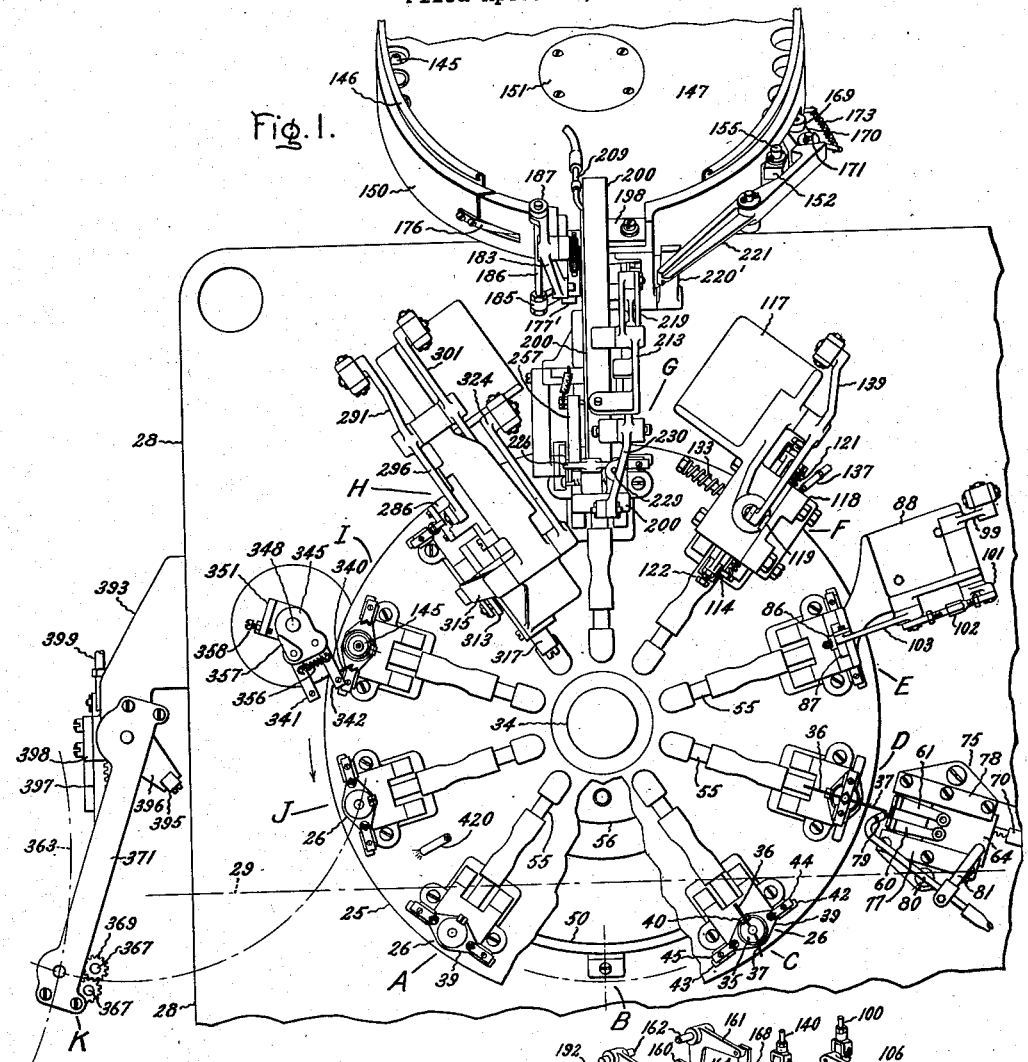

June 14, 1938. V. T. UBER 2,120,877
BASING MACHINE FOR ELECTRIC LAMPS AND SIMILAR ARTICLES
Filed April 17, 1937 6 Sheets-Sheet 1

Inventor:
Victor T. Uber,
by Harry E. Dunham
His Attorney.

June 14, 1938. V. T. UBER 2,120,877
BASING MACHINE FOR ELECTRIC LAMPS AND SIMILAR ARTICLES
Filed April 17, 1937 6 Sheets-Sheet 2
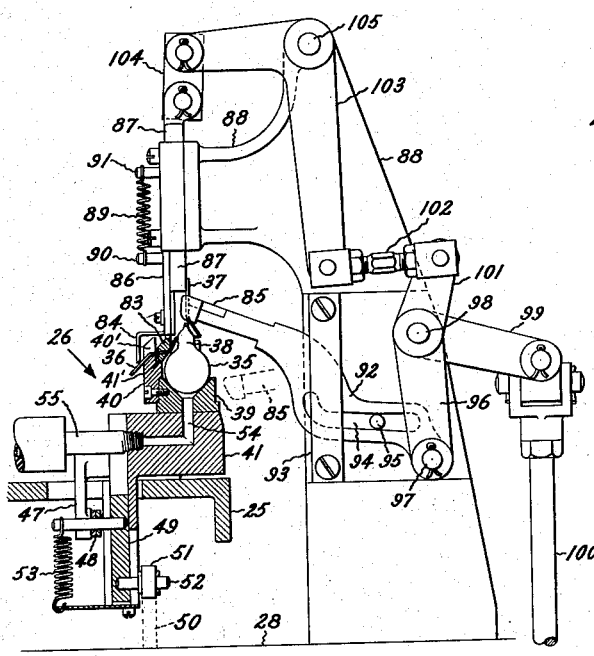
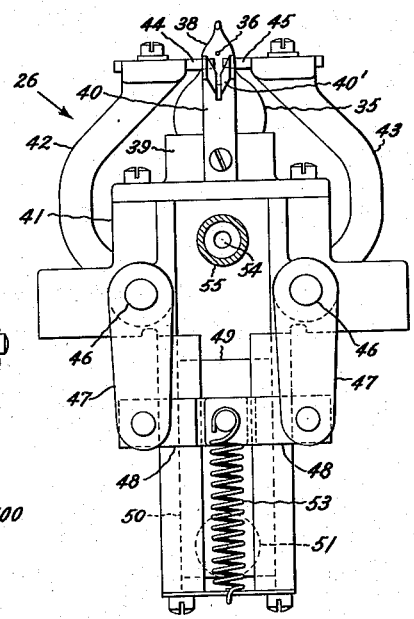
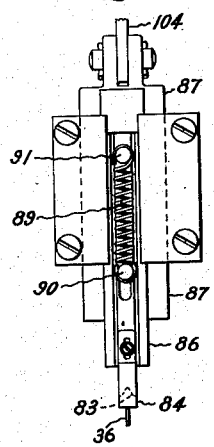
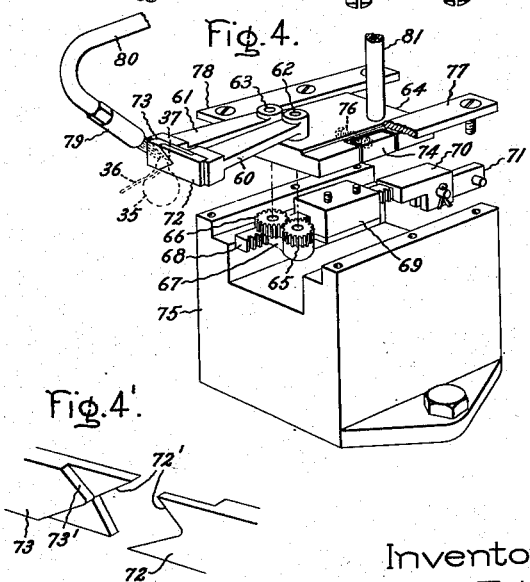
Inventor:
Victor T. Uber,
by Harry E. Dunham
His Attorney.

June 14, 1938. V. T. UBER 2,120,877
BASING MACHINE FOR ELECTRIC LAMPS AND SIMILAR ARTICLES
Filed April 17, 1937 6 Sheets-Sheet 3
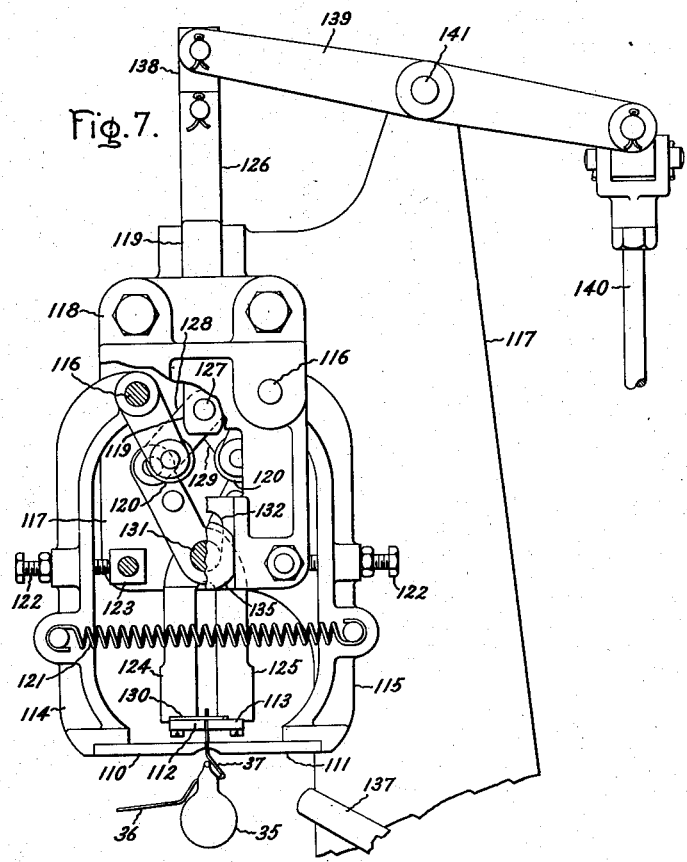
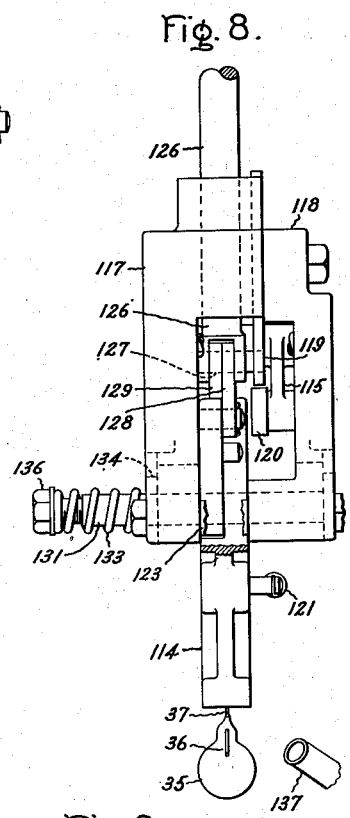
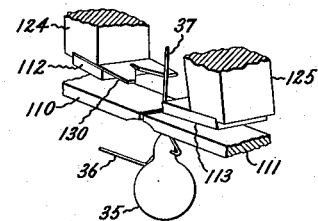
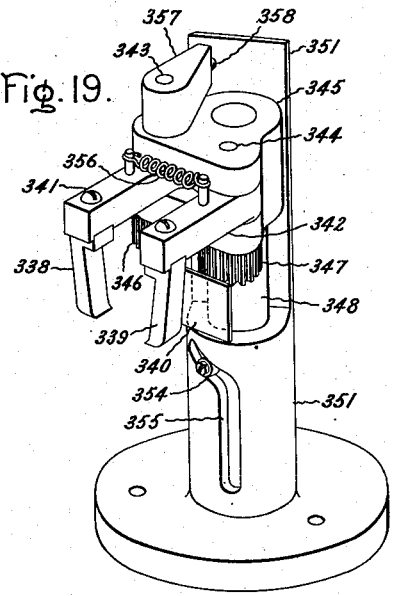
Inventor:
Victor T. Uber,
by Harry E. Dunham
His Attorney.

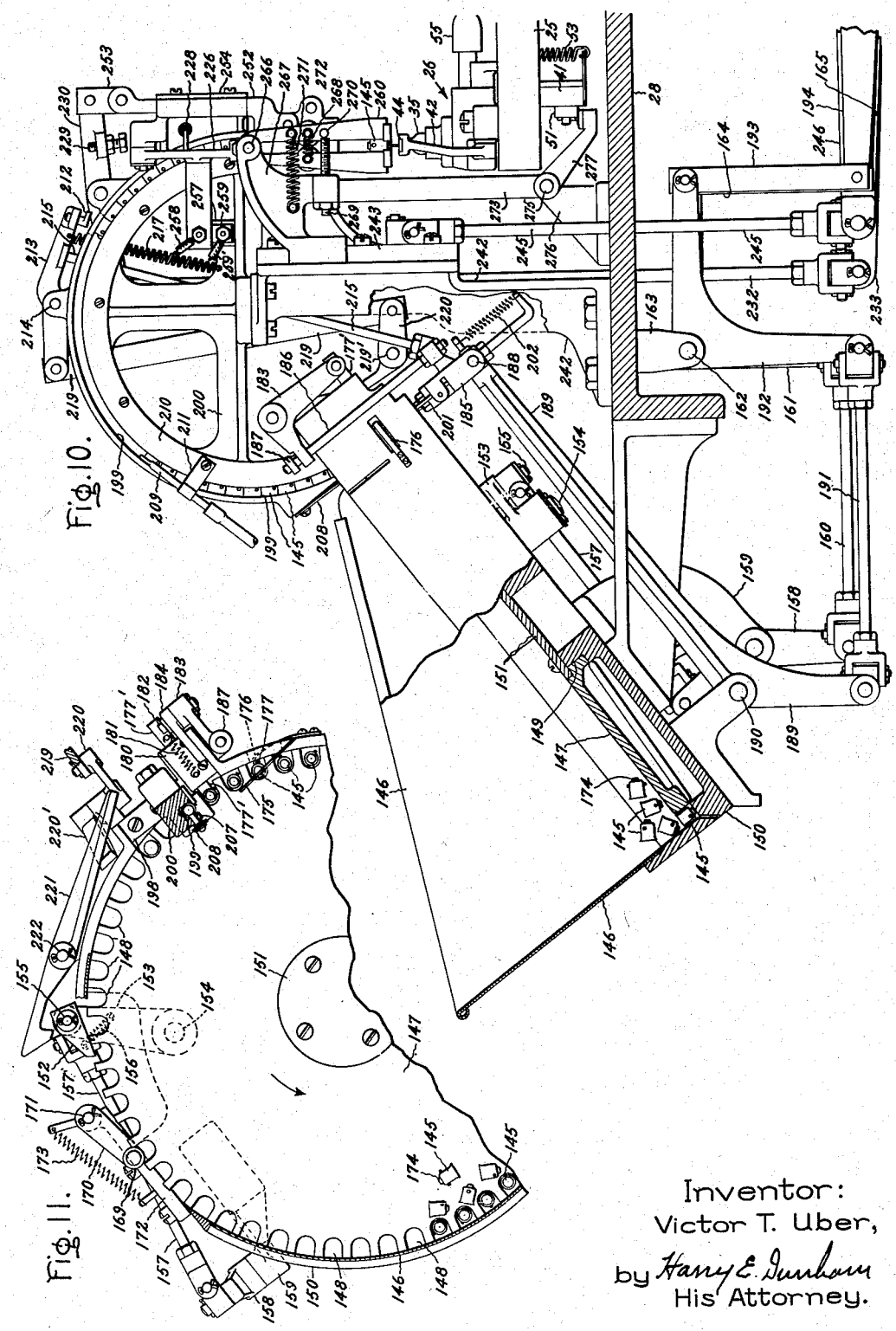

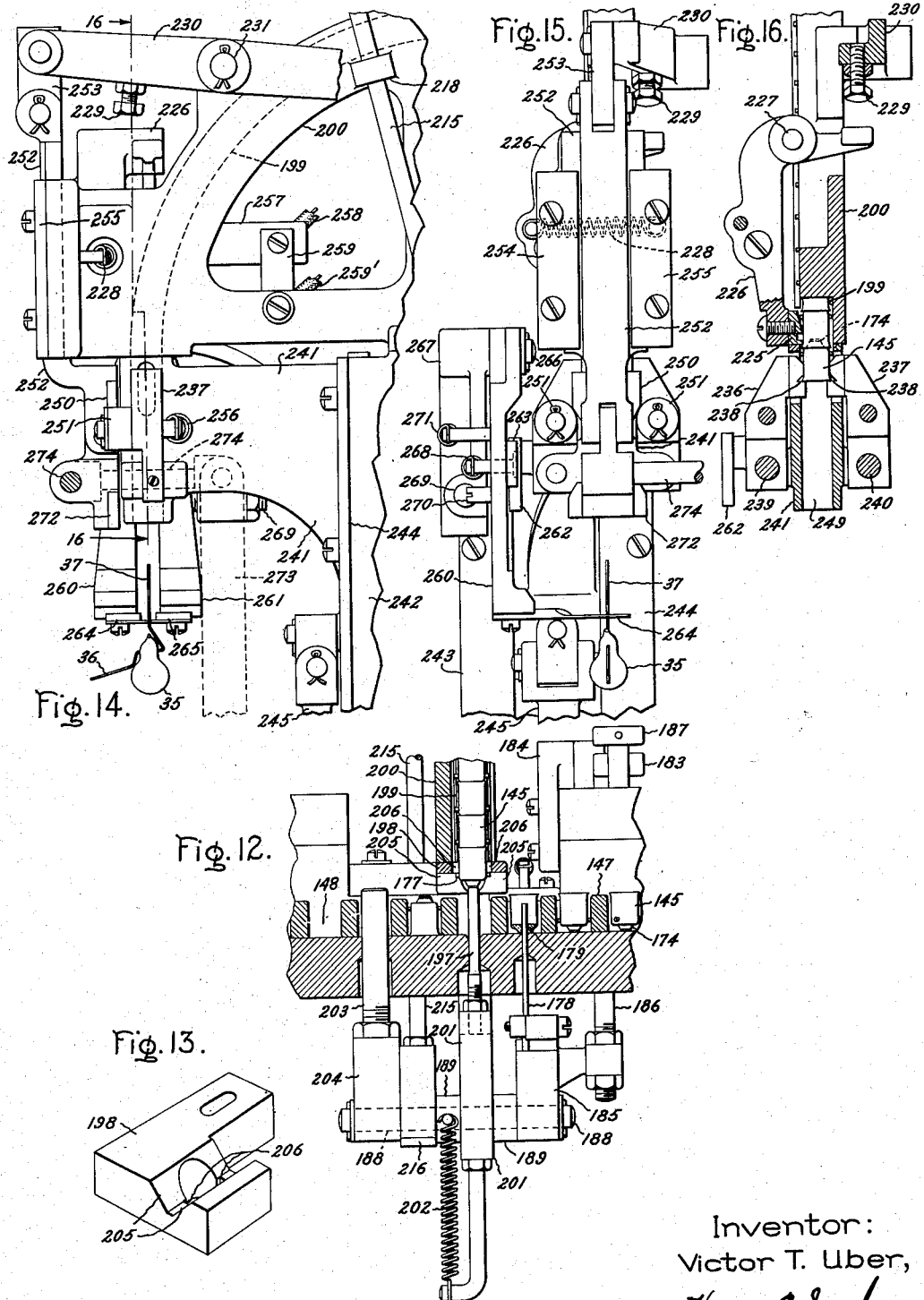

June 14, 1938.   V. T. UBER   2,120,877
BASING MACHINE FOR ELECTRIC LAMPS AND SIMILAR ARTICLES
Filed April 17, 1937   6 Sheets-Sheet 6
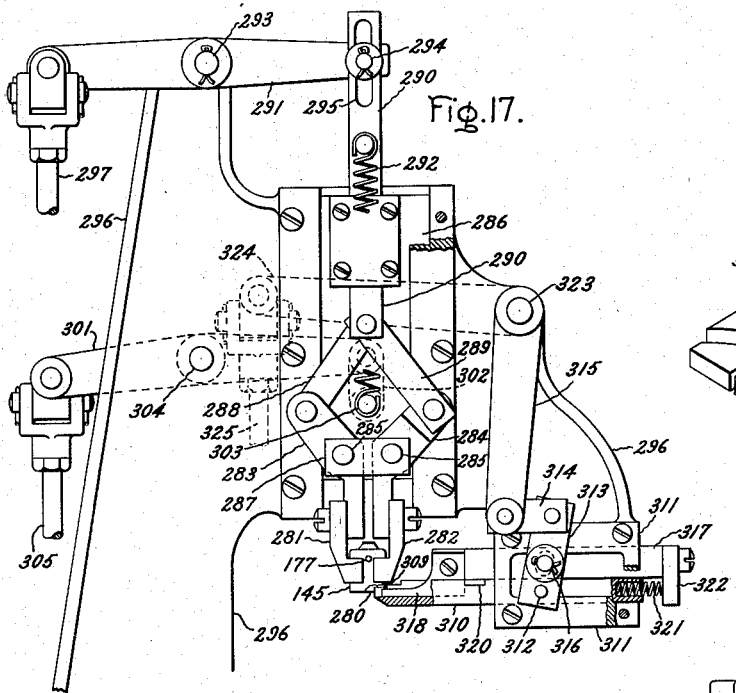
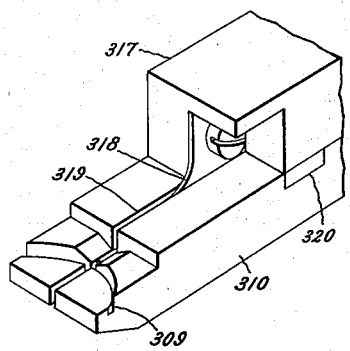
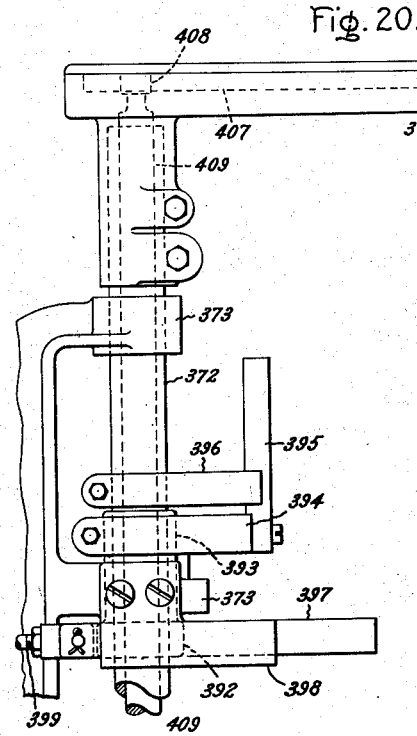
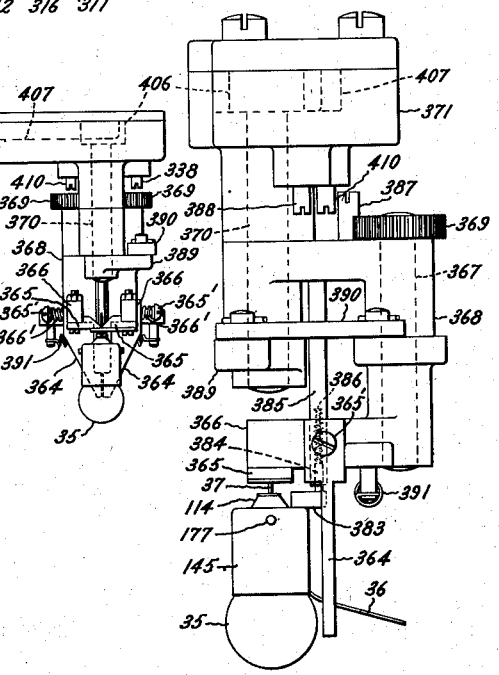
Inventor:
Victor T. Uber,
by Harry E. Dunham
His Attorney.

Patented June 14, 1938

2,120,877

UNITED STATES PATENT OFFICE 2,120,877

BASING MACHINE FOR ELECTRIC LAMPS AND SIMILAR ARTICLES

Victor T. Uber, Willoughby, Ohio, assignor to General Electric Company, a corporation of New York Application April 17, 1937, Serial No. 137,520

18 Claims. (Cl. 176—3)

My invention relates to apparatus for basing electric incandescent lamps and similar devices.

One of the objects of my invention is to provide apparatus for properly positioning the lead wires of a lamp and then automatically feeding a base to locate it properly on the lamp in engagement with said lead wires. The lamp and base are then transferred from the apparatus comprising my invention to other basing apparatus which causes the base to be heated and thereby cemented to the bulb of the lamp and also solders the said lead wires to the base. With the devices in use at the present time the services of several operators are required to straighten the lead wires, thread one or more of the lead wires through an aperture in the base and then place the lamp with its base in a basing machine. These manual operations are slow and costly and are eliminated by the apparatus comprising my invention.

According to my invention, the apparatus comprises an indexing carrier or turret having a plurality of heads thereon into which an operator places a lamp comprising a bulb having lead wires extending sidewardly therefrom. As the turret is indexed the lamp is carried through a number of stations at which the lead wires are straightened and bent to predetermined positions and then a base is placed on the lamp by means of a novel base feeding mechanism, one of the said lead wires being threaded through an aperture in the base. Means are provided for definitely positioning the base with respect to the lamp and to the said lead wires. Means are also provided for removing a lamp from the head in which it is carried in case the base is not properly positioned thereon. Further features and advantages of my invention will appear from the following detailed description of a species thereof and from the drawings.

Figure 2:
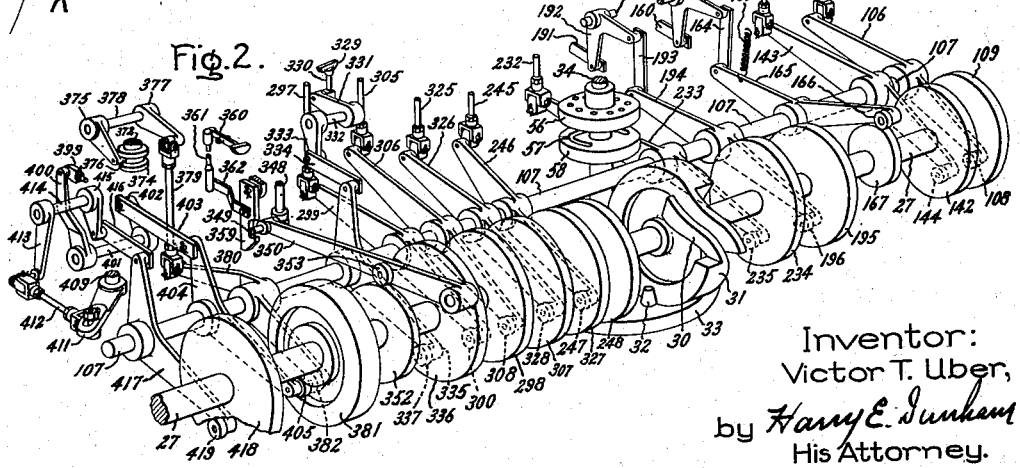

In the drawings, Fig. 1 is a plan view of a machine comprising my invention; Fig. 2 is a diagrammatic perspective view of the operating cam shaft, cams and associated operating levers; Fig. 3 is a side view of one of the turret heads; Fig. 4 is an exploded perspective view of lead wire straightening mechanism located at turret station D and Fig. 4' is a perspective view of the wire straightening jaws thereon; Fig. 5 is a vertical section and side elevation of a turret head and lead bending and positioning mechanism, respectively, located at turret station E; Fig. 6 is an end elevation of one portion of said bending and positioning mechanism; Figs. 7 and 8 are side and end elevations of lead wire setting mechanism located at turret station F; Fig. 9 is a perspective view of the end portions of the jaws of said setting mechanism in operation; Fig. 10 is a side elevation of base feeding mechanism located at turret position G; Fig. 11 is a plan view partially broken away of the hopper of said mechanism; Fig. 12 is a substantially vertical section through the testing, feeding and ejecting positions of the said hopper; Fig. 13 is a perspective view of a base orientating die; Figs. 14 and 15 are side and front elevations of the discharging portion of the base feeding mechanism; Fig. 16 is a section along line 16—16 of Fig. 14; Fig. 17 is a side elevation of base notching mechanism occupying turret station H; Fig. 18 is a perspective view of a portion of the notching dies thereof on an enlarged scale; Fig. 19 is a perspective view of lamp rejecting mechanism occupying turret station I; and Figs. 20 and 21 are side and end views, the latter on an enlarged scale, of lamp and base removing and transferring mechanism mounted adjacent turret station J.

Referring to the drawings, the machine comprises a turret or carrier 25 having a plurality of heads 26 mounted thereon at stations A to J inclusive. The heads 26 are moved from station to station in a counter-clockwise direction by indexing movements of the turret 25 caused by mechanism actuated by a cam shaft 27 shown in Fig. 2. The cam shaft 27 is mounted below the table 28 in the position of the dot dash line 29 and, upon rotation, it causes the curved portion 30 of a face cam 31 to engage a roller 32 on wheel 33. With one revolution of said cam 31, the roller 32, which is one of a plurality on wheel 33, is shifted sideward and said wheel 33 and turret 25, which are both fastened to shaft 34, are indexed. The operating means for the cam shaft 27 is not shown, but it is preferably turned either by a basing machine located adjacent to the present machine or by a separate electric motor.

During the first indexing movements of the turret 25, the heads 26, which appear as in Figs. 3 and 5, pass through stations A, B, and C, and each receives a lamp 35, placed therein by an operator. The lamp 35 is complete except for a base and is shown herein of butt seal construction in which leads 36 and 37 thereof extend outward from opposite sides of the lamp neck 38. The lamps 35 are placed with the bulbous portion in a holder 39 with the neck 38 upstanding and one lead 36 above the V notch 40' in a post 40. The post 40 is fastened to the holder 39 which is mounted on the body portion 41 of the head 26 which in turn is mounted on the turret 25. The lamp 35 is held in position in the head 26 by suction.

Further indexing of the heads 26 from station C to D results in the neck 38 of the lamp 35 being gripped between jaws 42 and 43 which straighten and then hold the lamp 35 in position during the subsequent operations. The jaws 42 and 43 engage the bulb neck 38 through the notched ends of the plates 44 and 45 attached thereto and each is mounted on a pin 46 extending through the body 41. Each pin 46 is attached to an arm 47 which is connected through a link 48 and suitable pins to a slide 49 located in ways in body 41. The position of the slide 49 and also the jaws 42 and 43 is controlled by a track 50, which raises the slide 49 to a higher position than shown when the jaws are open, through engagement with a roller 51 on a pin 52. A spring 53 which extends between a post on slide 49 and an arm of body 41 causes the slide 49 to take the lower position when track 50 is not engaged. The track 50 does not extend completely around the turret but consists of a semi-circular segment located at the various stations (A, B, C, I and J) at which the jaws 42 and 43 are held open. The suction produced in the holder 39 for retaining the lamp 35 therein is drawn through a passage 54 in the holder 39 and body 41, which is connected through piping 55 to the top half 56 (Figs. 1 and 2) of a rotary valve. The piping 55 which is connected to each of the heads 26 is also connected in each case to a separate passage in the upper half 56 of the rotary valve which is located over a groove 57 in the stationary lower half 58 (Fig. 2) of the rotary valve when the suction is required.

With the lamp held securely, the lead straightening mechanism shown in Figs. 1 and 4 at station D operates upon it. This mechanism is provided for purposes of gathering in and straightening the lead 37, which is to be passed through an aperture in the end of the base, so that it is brought within the operating range of the other mechanisms of the machine. The mechanism comprises jaws 60 and 61 which are mounted on pins 62 and 63 extending from a slide 64 and which are first closed on the lead 37 and then moved outward away from the head 26. The closing movement is produced by rotation of pins 62 and 63 which have gears 65 and 66 respectively on the lower ends thereof which intermesh and which are actuated by a gear segment 67 on pin 62 which is engaged by a rack 68. The rack 68 slides in ways in block 69 which is attached to the under side of the slide 64 and is now moved backward by block 70. The block 70 is attached through link 71 and other apparatus not shown to the operating apparatus of the mechanism at station E. The jaws 60 and 61 engage the lead 37 through blocks 72 and 73 respectively (Fig. 4') which have V-notched ends 72' which gather in the lead 37. Each of said notches 72' interlocks with a V-shaped boss 73' on the side of the other jaw. The blocks 72 and 73 close on the lead 37 until they grip it slightly whereupon further backward movement of the rack 68 overcomes the friction produced by the block 74 against the ways of standard 75 and the slide 64 and jaws 60 and 61 are moved back. The block 74 is pressed against the ways in the standard 75 by a spring 76 located in a well in slide 64 which is retained within the ways of said standard by plates 77 and 78. The backward movement of the jaws 60 and 61 in combination with the flame from a burner 79 serves to straighten the lead 37. The burner 79 is supplied with gas from a pipe 80 which is mounted on a post 81 extending upward from slide 64 and is moved back therewith. During the movement, the blocks 72 and 73 pass off the end of the lead 37. Before another lead 37 from a succeeding lamp 35 is operated on, rack 68 is moved forward, causing the jaws 60 and 61 to swing open and the slide 64 to be advanced. The movement of the slide 64 follows the opening of the jaws because of the friction produced by block 74. When the jaws 60 and 61 have opened sufficiently, the block 70 strikes the slide 64 and it is moved positively.

The lamp 35 is indexed from station D to E. At station E, the leads 36 and 37 are bent so that a base can be placed on the neck 38 of the lamp 35 and so that the leads 36 and 37, with the base in place, will be properly positioned with respect thereto. When the lamp 35 is first placed in the machine, the leads 36 and 37 extend laterally outward from the neck 38. The said leads are engaged by fingers 83, 84 and 85 respectively (Figs. 5 and 6). The fingers 83 and 84 are attached to a vertical sub-slide 86 which is mounted in a slide 87 in the ways of standard 88 and which is connected thereto through a spring 89 and posts 90 and 91 in slide 87 and sub-slide 86 respectively. The slide 87 is moved down to bring the V-notched end of the finger 83 against lead 36 and bend it downward so that it is adjacent the bulbous portion of the lamp 35 which will later contact the rim of the base. The outer end of the lead 36 passes into the V notch in the post 40 and is engaged by finger 84 which bends it downward out of the way. When this point is reached, the end of finger 83 strikes the shoulder 41' on the post 40 and the over-travel of slide 87 causes the sub-slide 86 to be shifted in its ways in the slide 87 and the spring 89 to be stretched. Post 90 moves in a slot in the sub-slide 86 during this interval.

The finger 85 first moves upward from the position shown in dotted lines (Fig. 5) and then swings inward and upward to the position shown in full lines. The lead 37 is moved to the position shown which moves it out of the way of the base and causes it to be threaded through the end aperture therein when the base is dropped into position. The finger 85 is attached to an arm 92 which is located between the side of standard 88 and a plate 93 and which engages through its cam slot 94, a stud 95 extending from said standard 88. Movement of the arm 92 is produced by an arm 96 which is connected thereto through pin 97 and is controlled by the travel of stud 95 in the cam slot 94. The arm 96 is attached to a shaft 98 which is rotatively mounted in standard 88 and is operated by a lever 99 and rod 100 from mechanism shown in Fig. 2. Shaft 98 also operates the slide 87 through arm 101, link 102, lever 103 and link 104. Lever 103 turns about a stud 105 extending from the standard 88. The operating mechanism for rod 100, as shown in Fig. 2, comprises a lever 106 which is pivoted on shaft 107 and engages, through roller 108, the slot of the face or box cam 109 on shaft 27.

Indexing the heads 26 into station F places the lamp 35 in operative relation to the mechanism shown in Figs. 7, 8, and 9 which further straightens out and sets the upper end of lead 37 so that it will not catch on the base when said base is dropped onto the lamp 35. The mechanism comprises jaws 110 and 111 which close on lead 37 at a point just above the lamp 35, and jaws 112 and 113 which close on said lead 37 at a point just above the first pair of jaws 110 and 111. The jaws 110 and 111 are mounted on levers 114 and 115 respectively which are mounted on pins 116—116 extending between a standard 117 and a plate 118. Said levers 114 and 115 are actuated by a slide cam 119 which engages rollers 120—120 mounted in the arms of levers 114 and 115. The slide cam 119 is mounted in ways in standard 117 in which it is held by plate 118 and is raised when the jaws 110 and 111 are to be closed so that it is moved from engagement with the rollers 120—120. The levers 114 and 115 are moved in by a spring 121 which extends between posts in each lever and are caused to take a central position over the head 26 located at that position by stop screws 122—122 thereon which strike blocks 123—123 mounted on standard 117. Jaws 112 and 113 are mounted on levers 124 and 125 respectively and are closed by the toggle arrangement afforded by a rod 126 which is connected through pin 127 and links 128, 129 to the ends of said levers. To the top of jaw 112 is fastened a notched guide 130 which directs the lead 37 to the center of the jaws 112 and 113. The levers 124 and 125 are pivotally mounted on a pin 131 which is located in the lower part of a slot 132 in the standard 117 and plate 118 and which engages standard 117 through a spring 133 and washer 134 and engages plate 118 through its head 135. The spring 133 is held in compression by a nut 136 on the pin 131 and causes washer 134 and the head 135 to engage the standard 117 and plate 118 respectively with sufficient friction to hold the jaws 112 and 113 in position while they are closed quite tightly. After being closed, the jaws 112 and 113 are pulled upward to the very end of the lead 37 which is thereby straightened and slightly stretched. This movement and the heat from the flame of a burner 137, which is directed onto the lead 37, cause it to be permanently set. The upward movement is produced by the continued upward movement of rod 126 after the jaws 112 and 113 have closed and results in the pin 131 shifting to a higher position in slot 132. The tightness with which the jaws 112 and 113 close on the lead 37 is controlled by the extent to which the spring 133 is compressed. Rod 126 and slide cam 119 are connected together by the pin 127 and are actuated through a link 138, lever 139 and rod 140 which is connected to operating mechanism located below the table 28 and shown in Fig. 2. The lever 139 turns about a pin 141 extending from standard 117. The operating mechanism comprises a box or face cam 142 which is mounted on cam shaft 27, and a lever 143 which engages the ways of said cam 142 through a roller 144 and which is connected to the rod 140.

At the next station G a base 145, which is selected from a pile in a hopper 146, is automatically placed in an inverted position and properly orientated with respect to the lamp 35 in the head 26. As shown in Figs. 10 and 11, the bases 145 are piled in the circular hopper 146 and are selected for feeding by means of a notched wheel 147 located on the bottom thereof which is turned so that the bases 145 are agitated and finally fall into the notches 148 in the periphery of said wheel 147. The wheel 147 is mounted on a boss 149 extending from the bottom 150 of the hopper 146 and is retained in place by a plate 151 which is attached to said boss 149. The hopper 146 and wheel 147 are tilted so that the bases 145 pile up at the far end thereof. The wheel 147 is indexed in a counter-clockwise direction by apparatus including a pawl 152 and a lever 153 which is pivoted on a pin 154 extending from the bottom 150 of the hopper 146. The pawl 152 is pivoted on a pin 155 extending from lever 153 and is caused to engage the notches 148 of the wheel 147 by a spring 156. Movement of the pawl 152 and lever 153 is brought about by a mechanical linkage comprising a rod 157, a lever 158 which is pivoted on an arm 159 extending from the hopper bottom 150, a rod 160, a lever 161 which is pivoted on pin 162 extending from a bracket 163 on the lower part of the table 28, a link 164 and a lever 165 (Fig. 2) which engages, through a roller 166, a cam 167 on cam shaft 27. The roller 166 is caused to follow the cam 167 by a spring 168 which is located between lever 165 and the table 28. A roller 169 on a lever 170 is provided to hold the wheel 147 in position between indexing movements. The roller 169 is mounted on the free end of the lever 170 which is pivoted on a pin 171 extending from a bracket 172 on the hopper bottom 150 and is held in position by a spring 173 which is located between posts extending from the bracket 172 and said lever 170.

The indexing movement of the wheel 147 causes each of the notches 148 therein to be carried under the pile of bases 145 at the lower end of the hopper 146, said bases being shifted about and finally falling into most of said notches 148. The bases 145 are greatly overweighted at one end because of the glass insulating plug 174 therein and generally fall into the notches 148 with the plug 174 lowermost. Each notch 148 is slightly larger than the diameter of the complete base 145 and holds said base 145 in either an upright or an inverted position. The rotation of the wheel 147 carries the notches 148 under a partition 175 which pushes off any extra bases 145 that may have been caught on said wheel 147 and carried up out of the pile with it. After passing under the partition 175, the base 145 in each notch 148 comes into engagement with a stationary finger 176 which wipes the side of the base 145 in order to rotate it slightly (about 45°) should the base 145 be lying with its bayonet pins 177 substantially lengthwise in the notch 148. The finger 176 catches the outermost pin 177 of the improperly orientated bases 145 and holds it for a period while the wheel 147 indexes so that the base 145 is rotated to the correct position. The finger 176 is resilient and moves in and out as required.

Rotation of the wheel 147 finally brings the bases 145 in the notches 148 before a slide 177' (Fig. 11) and above a pin 178 (Fig. 12). Said slide 177' holds a base 145 in position while the pin 178 clears foreign matter, such as a burr of insulation, from the small end hole 179 therein. The slide 177' lies in ways in the bottom section 150 of the hopper 146 in which it is retained by a plate 180 and is carried against the base 145 by the contraction of a spring 181 which is located between posts in the slide 177' and the plate 180. A slot in the outer end of the slide 177' is engaged by a pin 182 in lever 183 which controls the movement of said slide 177' by turning about a pin on bracket 184 which extends from the hopper bottom 150. The lever 183 is operated by the bracket 185 (Figs. 10 and 12) which is clamped directly to pin 178 and which engages said lever 183 through a rod 186 and collar 187. The bracket 185 is mounted on a pin 188 in the end of a lever 189 which in turn is pivoted on a pin 190 in the hopper bottom 150 and which forms one section of an operating linkage consisting of rod 191, lever 192 which pivots on pin 162, link 193 and lever 194 which engages the cam 195 on the cam shaft 27 through roller 196. The base 145 is released after the pin 178 has been moved upward to the position shown in Fig. 12 and then lowered again.

The next indexing movement of the wheel 147 carries the base 145 into position above a plunger 197 which is moved upward to push the base 145 upward out of the wheel 147 through a die 198 and into an arcuate channel 199 (see Fig. 10) in bracket 200. The plunger 197 is attached to a block 201 which is mounted between sections of lever 189 on the pin 188 and is slotted for said pin 188 so that a spring 202 is required to hold said block 201 in position on the pin 188. The spring 202 is attached to posts in lever 189 and the block 201 and allows the pin 188 to move upward in the slot in block 201 when the plunger 197 is unable to push a base 145 upward. The resiliency of the spring 202 is such that bases 145 which do not register properly with the aperture in die 198 due to distortion, improper registration, imperfections, etc., are not forced into said die 198 but fall back into a notch 148 in wheel 147. If the base 145 is in an inverted position, the plunger 197 enters the interior thereof and does not raise it sufficiently for it to enter the die 198. The inverted base 145 is carried with the wheel 147 for two more indexing periods whereupon it is ejected by a plunger 203. Plunger 203 is fastened to a block 204 which pivots on pin 188 and is actuated by movement thereof. To compensate for the failure of the bases 145 to fill all of the notches 148 in wheel 147 and to always enter said notches 148 right side up, the wheel 147, the pin 178 and the plungers 197 and 203 are operated twice as fast as the rest of the machine by the cams 167 and 195.

The bases 145 pushed into the die 198 (shown inverted in Fig. 13) are first fed into a round opening therein designed to prevent oversize and distorted bases 145 from passing. The pins 177 of said bases 145 engage the inclined surfaces 205 of a transverse V-shaped notch intersecting the round aperture in said die 198 which causes the bases 145 to be rotated and directs the pins 177 into grooves 206 in opposite sides of the round aperture. The die 198 is fastened to a portion of the hopper bottom 150 and, having properly orientated the bases 145, allows them to enter the channel 199 of the bracket 200. The channel 199 is provided with a groove for one of the base pins 177 and is entered by a friction pin 207 (Fig. 11) which prevents the lowermost base 145 from falling back down through the die 198. The friction pin 207 is attached to a spring leaf 208 (Fig. 10) which is attached to bracket 200 and which presses said pin 207 against the base 145. Succeeding bases 145 inserted in the end of the channel 199 force the bases 145 already therein upward around the circular portion thereof (Fig. 10) until they are struck by the air jet issuing from pipe 209. During said movement, the outer base pin 177 rides on the edge of a curved plate 210 which partially closes up one side of the channel 199. The pipe 209 is mounted on the bracket 200 by arm 211 and is supplied with compressed air from a source not shown. The jet of air blows the base 145 along in the channel 199 until it encounters other bases 145 usually in the position shown at the right side of the channel in Fig. 10 and comes to rest below a feeler 212.

The air jet also blows out through a hole (not shown) in the bottom of the channel 199 all particles of insulation from the bases 145, etc., which might hinder movement thereof in the said channel. There is a hole in the bracket 200 below the feeler 212 which is periodically carried down into contact with a base 145 located adjacent thereto or to an even lower position if a base 145 does not occupy this position. The feeler 212 is mounted on an end of lever 213 which is pivoted on a pin 214 extending from bracket 200 and which is actuated through a push rod 215. The push rod 215 is, as shown in Fig. 12, attached by means of block 216 to pin 188 which causes it to reciprocate. The end of lever 213 is kept in contact with the upper end of the push rod 215 by a spring 217 which extends between the said lever 213 and bracket 200. Said end of the push rod 215 is held in position by a lug 218 (Fig. 14) extending from bracket 200. When raised above the bases 145 or resting upon a base 145, the feeler 212 holds the lever 213 in a position which causes the indexing movement of the wheel 147 to stop and so prevents the introduction of more bases 145 into the channel 199. The lever 213 (Fig. 10) is attached through a link 219 to a lever 220 which turns a shaft 219'. The shaft 219' is fastened to arm 220' (Fig. 11) which turns a catch 221 about the pin 222 extending from the hopper bottom 150 so that it moves to a position in front of the pin 155 of the indexing mechanism for the wheel 147 on the back stroke and prevents further movement thereof. The catch 221 and arm 220' are shown in Figs. 1 and 11 in the feeding position whereas lever 213 in Fig. 10 is in the non-feeding position. The weight of the upper end of the catch 221 swings it out of position when lever 213 and arm 220' are moved to the non-feeding position so that the indexing mechanism is again allowed to operate.

The bases 145 pass down the forward part of the channel 199 in bracket 200 by gravity and are finally engaged by the block 225 (Fig. 16) of an escapement mechanism. The block 225 is pushed against the end base 145 in the channel 199, so as to prevent it from moving, by a lever 226 which is pivoted on a pin 227 extending from bracket 200 and which is held in this position by a spring 228 extending between posts in said lever 226 and the bracket 200. The release of the bases 145 is caused by a clockwise movement of lever 226 and is brought about by engagement of a bolt 229 in a lever 230 with the horizontal arm of said lever 226. The lever 230 pivots on a pin 231 (Fig. 14) extending from bracket 200 and is operated by rod 232 (Figs. 2 and 10) from a lever 233 which engages the ways of cam 234 through roller 235. The base 145 released by the escapement mechanism drops down between jaws 236 and 237 and comes to rest on the projecting portions 238 thereof. The jaws 236 and 237 are so positioned with respect to the end of the channel 199 in bracket 200 that only one base 145 escapes therefrom and the succeeding base 145 takes a position before the escapement mechanism. The jaws 236 and 237 are pivoted on pins 239 and 240 on a slide 241 which is located in vertical ways in a standard 242 in which it is held by plates 243 and 244. The standard 242 supports the bracket 200 and is attached to the table 28. The slide 241, and consequently the jaws 236 and 237, are held in position by a rod 245 which is attached to a lever 246 (Figs. 2 and 10) which in turn engages, through roller 247, a cam 248 on cam shaft 27. The ends of the jaws 236 and 237 extend into a channel 249 in the slide 241 and are held open at this position by a cam 250 which is located between a roller 251 pivotally attached to each of said jaws. The jaws 236 and 237 are opened simultaneously with the operation of the escapement means since the cam 250 is attached to a slide 252 which is connected by link 253 to lever 230 and is moved downward therewith. The slide 252 is mounted in ways in bracket 200 in which it is held by plates 254 and 255. When the escapement mechanism is closed on the next to the last base 145, the slide 252 and cam 250 are moved upward and the jaws 236 and 237 are pulled together so as to grip the end base 145 located therebetween, by the contraction of a spring 256 (Fig. 14) which is located between posts in the said jaws 236 and 237. Should the bases 145 not advance to the escapement mechanism for any reason, the lever 226 will swing further into the channel 199 and an electric alarm circuit will be closed. The circuit includes a pair of contacts (not shown), one of which is mounted on an insulating arm 257 (Fig. 14) and connected to wire 258, and the other of which is mounted on an arm 259 extending from bracket 200 and attached to wire 259'. The warning light and other parts of the alarm system are not shown.

A turret head 26 carrying a lamp 35 is indexed into position below the slide 241 and said slide, carrying a base 145, immediately begins to move down. With the first movement of slide 241, jaws 260 and 261 are closed on the upright lead 37 as the wide part of cam 262 is carried from between rollers 263 which are pivotally attached to said jaws 260 and 261. The arms 264 and 265 of the jaws 260 and 261 engage the lead 37 and hold it accurately in position so that it will pass through the opening in the insulating plug 174 of the base 145. The jaws 260 and 261 are pivoted on a pin 266 extending from a bracket 267 and are drawn together by the contraction of spring 268 which extends between posts in said jaws. The position of the jaws 260 and 261 above the lamp 35 is adjusted by turning screw 269 in or out of the bracket 267 which is fastened to the standard 242 since a stud 270 in jaw 260 engages the screw 269 and a spring 271 pulls jaw 260 toward the other jaw 261. The spring 271 extends between posts in jaw 260 and bracket 267. This apparatus is not essential to the operation of the machine and is dispensed with when certain types and sizes of bases are being handled. As the slide 241 is moved down, the lead 37 enters the channel 249 therein and the hole in the insulating plug 174 of the base 145. The rollers 251 of jaws 236 and 237 engage opposite sides of a cam 272 by which they are opened to such an extent that the base 145 slides downward in the channel 249 and comes to rest on the arms 264 and 265 of jaws 260 and 261. The channel 249 serves to guide the base 145 to the proper location so that it is properly positioned on the lamp 35 and does not catch on the lead 37. These movements occur if the turret head 26 carries a lamp 35 but if the head 26 be empty, the cam 272 is automatically swung out of position so that it is not engaged by the rollers 251 and the jaws 236 and 237 are therefore not opened. In this case, the base 145 is not released but is carried back up with the jaws 236 and 237. The said base 145 carried upward by the jaws 236 and 237 blocks the movement of the other bases 145 from the channel 199 in bracket 200. The cam 272 is pivotally mounted on slide 252 and is swung out of position by movement of arm 273 (Fig. 14) which is connected thereto by rods 274.

The arm 273 is attached to the shaft 275 (Fig. 10) which is supported by a bracket 276 on the table 28, and is turned by engagement of arm 277 with the roller 51 on the turret head 26. The roller 51 engages the arm 277 only when it is below its normal position due to the fact that the jaws 42 and 43 of the head 26 have closed further than is normally allowed by the neck 38 of a lamp 35. Once the base 145 is deposited on the arms 264 and 265 of jaws 260 and 261 respectively, the slide 241 moves upward again for another base 145 and the said arms 264 and 265 are separated, leaving the base 145 to drop down onto the plates 44 and 45 of the jaws 42 and 43 of the head 26. The jaws 260 and 261 are opened by engagement of the rollers 263 thereon with opposite sides of the cam 262. The turret 25 is now indexed.

At position H, the base 145 is lifted from the plates 44 and 45 of the jaws 42 and 43 of the turret 25, adjusted angularly to correct any misalignment, notched and, after said jaws 42 and 43 are opened, is placed over the end of the lamp 35 in the position it is to be attached thereto. The notching operation consists, as shown in Figs. 17 and 18, in cutting a small notch in the rim of the shell 280 of the base 145 so that the sideward projecting lead 36 will fall thereinto and permit the rim of the base shell 280 to seat firmly against the bulb of the lamp 35. The base 145 is taken from its position on the plates 44 and 45 by jaws 281 and 282 which are so shaped as to engage the sides of the base pins 177 if the base 145 is turned out of its correct angular position and to turn said base 145 back into position. The jaws 281 and 282 are attached to levers 283 and 284 respectively, each of which is mounted on a pin 285 extending from a slide 286. The outer ends of the pins 285—285 are connected together by a block 287. The levers 283 and 284 are operated by a toggle system comprising links 288 and 289 and a slide rod 290, the latter of which is mounted in ways in slide 286 and is operated jointly by a lever 291 and spring 292. The jaws 281 and 282 are closed by a clockwise movement of lever 291 about a pin 293 to carry a pin 294 down from the upper end of a slot 295 in the slide rod 290. The spring 292, which is located between posts in slide 286 and the slide rod 290, then contracts and the jaws 283 and 284 close as the slide rod 290 moves down. The pin 293 is mounted on a standard 296 and supports the lever 291 which is operated through rod 297 from cam 298 and lever 299 (Fig. 2). The lever 299 is mounted on shaft 107 and engages a box or side cam 298 through roller 300. Having gripped the base 145, the jaws 281 and 282 move upward until said base 145 is some distance above the head 26 and slightly above the notching mechanism. The upward movement is brought about by a similar movement of slide 286 which is slid in its ways in standard 296 by lever 301. The lever 301 engages the slide 286 through a link 302 and pin 303 and is turned about the pin 304 extending from standard 296. A slot in the standard 296 behind the slide 286 is provided for the rearward extending portion of pin 303. Lever 301 is actuated by rod 305 which is also connected to the lever 306 (Fig. 2) which engages cam 307 through roller 308. The lever 306 turns about the shaft 107.

The notching mechanism shown in Figs. 17 and 18 is now moved under the base 145 which is lowered until the rim of the base shell 280 rests in a groove 309 in the slidably mounted die 310, as shown in Fig. 17. The die 310 is mounted in ways in standard 296 in which it is held by plate 311 and is actuated through pin 312 by lever 313, link 314 and arm 315. During the forward movement of the die 310, the lever 313 does not turn about either pin 312 or 316 and the sub-slide 317, which rides on die 310 and in ways in the standard 296 and which supports pin 316, remains stationary therein. The position of the sub-slide 317 is fixed by the engagement of a notching blade 318, which is attached to said sub-slide 317 and is located in a slot 319 in the die 310, with a block 320 which is located in a transverse channel in said die 310. The blade 318 is kept in contact with the block 320 by a spring 321, a portion of which is located within a well in the die 310, and which engages an arm 322 extending from the sub-slide 317. When the die 310 is properly located below the base 145, the pin 312, which extends through said die 310 into a slot (not shown) in the standard 296, strikes the end of said slot. A rest period now occurs in the movement of arm 315 while the base shell 280 is lowered into the groove 309 whereupon the arm 315 again moves and the notching blade 318 is caused to strike and punch a small notch in the shell 280. The blade 318 is actuated through the lever 313 which pivots on pin 312 and, acting through pin 316, advances the sub-slide 317. The arm 315 which actuates these parts is mounted on a pin 323 which passes through the standard 296 and is attached to arm 324. The arm 324 is actuated through a rod 325 which, as shown in Fig. 2, is connected to lever 326 which engages a cam 327 through roller 328. The lever 326 turns on shaft 107.

After the base 145 is notched, it is raised by the jaws 281 and 282 and the die 310 and sub-slide 317 are moved back. During this interval, the jaws 42 and 43 of the turret head 26 swing outward away from the neck 38 of the lamp 35, leaving it in an upright position on the head 26. The jaws 42 and 43 are opened by a downward movement of roller 51 which at this position rides on a block 329 (Fig. 2) on the end of rod 330 instead of on track 50. The rod 330 is held in position by the table 28 and is moved by arm 331 which is fastened to and moved by the shaft 332 which is mounted on the under side of the table 28 and is turned by arm 333. The arm 333 is actuated by a lever 334 which is connected thereto through a link 335 and which engages a cam 336 on cam shaft 27 through roller 337. The base 145 is now moved down over the upstanding lead 37 and the neck 38 of the lamp 35 and, when in contact with the bulb, is released. The upstanding lead 37 passes through the center opening in the insulating plug 174 of the base 145 and the sideward projecting lead 36 enters the notch cut in the rim of the base shell 280. Before the head 26 is indexed to the next position, the jaws 42 and 43 are closed, this time engaging the base 145 and holding it in position.

With the next indexing movement of the head 26, the roller 51 thereof leaves the block 329 and the jaws 42 and 43 close on the base 145. Midway between stations H and I the roller 51 contacts the end of lever 360 (Fig. 2) and, upon reaching station I, rides on the end of track 50 which causes the jaws 42 and 43 to open. At station I, the head 26 is located before a mechanism which operates only to remove the lamp 35 when it does not carry a base 145. Normally, the base 145 rests on the lamp 35 and, until roller 51 reaches track 50, is gripped by the jaws 42 and 43. However, in case a base 145 is not present, said jaws 42 and 43 close further until in contact with the neck 38 of the lamp 35. When the latter movement occurs, the roller 51 of the head 26 is below its normal position and moves the lever 360 accordingly so that mechanism controlled thereby causes jaws 338 and 339 (Fig. 19) to be turned to a position over the head 26 and to be lowered into engagement with the lamp 35 when the head 26 reaches station I. Should a base 145 be hanging on the end of lead 37 in a position above jaws 42 and 43, it is struck by a plate 340 which is attached to jaw 339 and is swept sideward into a box (not shown) at the side of the turret 25. The jaws 338 and 339 are mounted on arms 341 and 342 respectively which are fastened to pins 343 and 344 respectively. The pins 343 and 344 are pivoted in a bracket 345 and are attached to the intermeshing gears 346 and 347 respectively. The bracket 345 is attached to a vertical shaft 348 which, as shown in Fig. 2, has a pair of collars thereon engaging therebetween the end of a pin 349 in a lever 350. The shaft 348 is slidably mounted in the bracket 351 and causes the jaws 338 and 339 to move as described when it is moved up and down by the lever 350 which engages cam 352 through roller 353. The first part of the downward movement of the shaft 348 turns the jaws 338 and 339 to a position above the head 26, due to the fact that a roller 354 (Fig. 19), which is attached to said shaft 348, then travels in the diagonal portion of the slot 355 in the bracket 351 and causes said shaft 348 to turn. Further downward movement of the shaft 348 causes the jaws 338 and 339 to contact the lamp 35 and to be pushed open thereby. The jaws 338 and 339 are pulled toward each other by a spring 356 which is located between posts in arms 341 and 342 and which causes said jaws 338 and 339 to grip the lamp 35 after they have passed over the bulb thereof. Shoulders on the arms 341 and 342 adjacent the pins 343 and 344 prevent the jaws 338 and 339 from closing completely when a lamp 35 is not in position therebetween. The return upward and turning movement of the jaws 338 and 339 carries the lamp 35 over a container (not shown) and carries an arm 357 on pin 343 against a stud 358 extending from bracket 351 to open said jaws. The released lamp 35 falls into the said container and the mechanism is ready for another cycle of operation. The operation of this mechanism at station I normally does not occur because a portion of pin 349 (Fig. 2) extending from the side of lever 350 lies in the notch in latch 359 and is caught thereby. The latch 359 is attached to a pin extending from the bottom of the table 28 and supports lever 350 so that roller 353 cannot follow the contour of cam 352. Operation of the mechanism occurs when the roller 51 of the turret head 26 lies in the lower position already described and engages the lever 360 which turns about the stationary pin on which it is mounted. The other end of lever 360 is connected through link 361 and arm 362 to the latch 359 which is swung out of engagement with pin 349 when a baseless lamp comes to position I.

The lamp 35 and base 145 are unloaded from my machine and are placed in a basing machine which is located adjacent thereto and which is preferably of the type shown in Patent 1,708,756, J. T. Fagan et al., issued April 9, 1929. The basing machine comprises a plurality of heads which are indexed along line 363 (Fig. 1) and which receive in turn a lamp 35 with a base 145 transferred from station J to point K. Mechanism for this transfer is shown in Figs. 1, 20 and 21, and is provided with separate pairs of jaws 364—364 and 365—365 for engaging the leads 36 and 37, respectively, at points adjacent the base 145. The object of this particular construction is to eliminate the need for changes in the transferring mechanism when the machine is made to operate with other types and sizes of lamps. The jaws 364—364 are each fastened to an arm 366 by means of a screw 365' and a spring 366' which together allow a certain amount of movement of the arm 366 after the jaws 364 engage the lead 36. The jaws 365—365 are each fastened directly to one of said arms 366 and they engage and grip lead 37 during the movement of jaws 364—364 which compresses the springs 366'. The jaws 365—365 are the principal means of support for the lamp 35 and base 145, the other jaws 365 preventing the assembly from turning out of position. Should the jaws 365 fail to engage lead 37, the lamp 35 will not be removed as the springs 366'—366' are not of sufficient strength to cause jaws 364 to grip and support said lamp. The arms 366—366 are each attached to a pin 367 which is carried in an aperture of the head 368 and which is attached to a gear 369 which meshes with a similar gear 369 of the other pin 367. The transfer head 368 is pivotally mounted on a shaft 370 which in turn is mounted in an aperture in the transfer arm 371.

When the turret head 26 is indexed into station J, the transfer jaws are located thereabove and are moved down into operative relation with the lamp 35 and base 145. The downward movement of the jaws is caused by a similar movement of the transfer arm 371 which is attached to the upper end of a sleeve 372. The sleeve 372 is slidably mounted in bracket 373 and is moved vertically, as shown in Fig. 2, by mechanism engaging collars 374 on the lower end thereof. The said mechanism comprises an arm 375 which engages the collars 374 through roller 376, an arm 377 which is connected to arm 375 through shaft 378, a rod 379 which connects arm 377 to lever 380, and a double face cam 381 which is engaged by a roller 382 in the end of lever 380. The lever 380 is turned about shaft 107 and is operated through engagement of the roller 382 with the ways (not shown) in the far side of the cam 381.

As the transfer jaws are moved down into position, a shoe 383 (Fig. 21) strikes the top of the base 145 pushing it firmly against the lamp 35. The shoe 383 is attached to a stud 384, one end of which is located in the end of a tube 385 extending from head 368, and which is pressed downward by a spring 386 in said tube. The shoe 383 holds the base 145 in position during the transferring operation and is supported, when not against a base 145, by a pin (not shown) located in stud 384 and in a slot in tube 385. With the transfer jaws in the pick-up position, a stud 387 extending from the head 368 is against a stud 388 extending from arm 371. Closing of the jaws 364 and 365 is accomplished by rotation of shaft 370 in a clockwise direction which relieves the jaws of the pressure formerly exerted through arm 389, link 390 and one of the arms 366, and allows spring 391, which extends between posts in each arm 366, to close the jaws. The transfer arm 371 and the lamp 35 and base 145 are now lifted by the mechanism already described and are swung so as to place said lamp 35 and said base 145 in a head of the basing machine at position K. The arm 371 is swung by rotation of a gear 392 which is provided with a tubular portion 393 extending through the lower part of bracket 373 and connected through arm 394, bar 395 and arm 396 to tube 372. The arm 394 is attached to the tubular portion 393 of gear 392 whereas the arm 396 is attached to tube 372. This construction allows the transferring arm 371 and the tube 372 to be raised and lowered without disconnecting the rotating mechanism since arm 396 slides along the bar 395. The gear 392 is rotated by a rack 397 which is supported by a bracket 398 extending from bracket 373. The rack 397 is connected through rod 399 to arm 400 (Fig. 2) which is mounted on shaft 401 which in turn is operated through arm 402, bar 403 and the lever 404. The lever 404 is pivoted on shaft 107 and engages ways in cam 381 through roller 405. During the transferring movement of the arm 371, the lamp 35 and base 145 are turned slightly so that they are nearly correctly positioned when reaching the basing machine. This adjustment is provided by holding the head 368 in one position during this movement and is provided by the gradual rotation of shaft 370 which actuates said head through arm 389, link 390 and one of the arms 366. The shaft 370 is provided with a gear 406 on its upper end which meshes with a rack 407 lying in the ways in arm 371. The rack 407 also meshes with a gear 408 on the end of a post 409 located in the center of sleeve 372 and is moved longitudinally the required amount by the turning movement of the arm 371 as the gear 408 is held stationary.

In this instance, the transfer arm 371 is raised a short distance while at position K to place the end lead 37 and the insulating plug 174 properly in the mechanism of the basing machine. This movement is accomplished through sleeve 372 by mechanism already described. Proper orientation of the base 145 and lamp 35 now takes place. The base 145 and lamp 35 are turned to their proper position by rotation of the transfer head 368, through movement of rack 407, until stud 387 thereof strikes stud 410. The rack 407 is now moved by rotation of gear 408 and post 409, the latter of which, as shown in Fig. 2, is turned by arm 411 which is connected through rod 412 to arm 413 which in turn is connected through shaft 414, arm 415 and bar 416 to lever 417. The lever 417 is turned about shaft 107 by cam 418 which it engages through roller 419. After the rotation of the transfer head 368 is stopped, the rack 407 continues to move, causing shaft 370 to be turned separately and the jaws 364 and 365 to be opened, thereby releasing the lamp 35 and base 145.

Should a lamp 35 still remain in the turret head 26 after operation of the transfer mechanism, it is blown out at a point midway between stations J and A by a blast of air from pipe 420 as the turret 25 is indexed. The vacuum normally drawing on the lamp 35 and holding it in position in the head 26 is cut off by the rotary valve 56—57 at this point so that the lamp is easily removed.

What I claim as new and desire to secure by Letters Patent of the United States is:

1. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of travel of said heads at succeeding stations for positioning said leads, and means disposed adjacent to the path of travel of said heads at another station for advancing a base having an apertured insulating plug in one end toward the lamp to thread one of said leads through said aperture and to position said base properly on the lamp.

2. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of travel of said heads at succeeding stations for positioning said leads, means disposed adjacent to the path of travel of said heads at another station for advancing a base having an apertured insulating plug in one end toward the lamp to thread one of said leads through said aperture and to position said base properly on the lamp, and transferring means disposed adjacent to the path of travel of said heads at another station for conveying the lamp and base to a basing machine and for holding said lamp and base in the proper relation to each other during the transferring operation.

3. A machine of the class described comprising a carrier having a plurality of heads mounted thereon, means for indexing said carrier intermittently to advance the heads from one station to another, a holder on each of said heads for a lamp having leads extending therefrom, means mounted on each of said heads for positioning the lamp in the holder thereon, means disposed adjacent to the path of said heads at succeeding stations for bending said leads to a predetermined shape and for straightening and setting the end portion of one of said leads, and means disposed adjacent to the path of said heads at another station for advancing a base having an apertured insulating plug in one end toward the lamp to thread the straightened lead through said aperture and to position said base properly on the lamp.

4. A machine of the class described comprising a carrier having a plurality of heads mounted thereon, means for indexing said carrier intermittently to advance the heads from one station to another, a suction holder on each of said heads for holding a lamp having an upwardly extending neck portion with leads extending therefrom, means for connecting said holders to a source of vacuum for a portion of the movement of the carrier including all but the station following the unloading station so that the lamp is retained in the holder, a pair of jaws mounted on each of said heads, means for causing said jaws to close on the neck of the lamp to position and hold said neck, means disposed adjacent to the path of said heads for positioning the leads extending from the lamp, and means disposed adjacent to the path of said heads at a succeeding station for advancing a base having an apertured insulating plug in one end toward the lamp to thread one of the leads through said aperture and to position said base properly on the lamp.

5. A machine of the class described comprising a carrier having a plurality of heads mounted thereon, means for indexing said carrier intermittently to advance the heads from one station to another, a holder on each of said heads for a lamp having leads extending therefrom, a notched post mounted on each of said heads below the position taken by one of the leads of the lamp, a finger located at one station, means for actuating said finger to bend the said lead down along the side of the lamp in one of said heads and laterally across the notch in the post thereon, means disposed adjacent to the path of said heads for positioning the other of said leads, and means disposed adjacent to the path of said heads at a succeeding station for advancing a base having an apertured insulating plug in one end toward the lamp to thread the last-mentioned lead through the said aperture and to place the base properly on the lamp in contact with the first-mentioned lead.

6. A machine of the class described comprising a carrier having a plurality of heads mounted thereon, means for indexing said carrier intermittently to advance the heads from one station to another, a holder on each of said heads for a lamp having an upwardly extending neck portion with leads extending therefrom, means disposed adjacent to the path of said heads at one of the stations for bending one of said leads to a predetermined position, a finger located at one of the stations, means for actuating said finger to bend another lead vertically upward, a pair of jaws disposed adjacent to the path of said heads, means for closing said jaws to grip said second-mentioned lead at a point adjacent the lamp, a second pair of jaws mounted adjacent to and above the first pair of jaws, means for closing said second pair of jaws to grip said second-mentioned lead with a definite pressure and move upwardly away from the first pair of jaws along the lead to thereby straighten and set it, and means disposed adjacent to the path of said heads at a succeeding station for advancing a base having an apertured insulating plug in one end toward the lamp to thread the said second-mentioned lead through the aperture and to place the base properly on the lamp in contact with the first lead.

7. A machine of the class described comprising a carrier having a plurality of heads mounted thereon, means for indexing said carrier intermittently to advance the heads from one station to another, a holder on each of said heads for a lamp having leads extending therefrom, a pair of jaws disposed adjacent to the path of said heads, means for closing said jaws to gather in and grip one of said leads with a definite pressure and then move away from the lamp along the lead to thereby straighten it, means located adjacent to the path of said heads for bending a second lead to a predetermined position, a finger disposed adjacent to the path of said heads at one of the stations for bending the first-mentioned lead upward, a second pair of jaws disposed adjacent to the path of said heads at a succeeding station, means for closing said jaws to grip the first lead at a point adjacent the lamp, a third pair of jaws mounted adjacent to the second pair of jaws, means for closing said third pair of jaws to cause them to grip the first lead with a definite pressure and move away from the second pair of jaws and the lamp along the lead and thereby straighten and set it, and means disposed adjacent to the path of said heads at a succeeding station for advancing a base having an apertured insulating plug in one end toward the lamp to thread the first lead through the aperture and to place the base properly on the lamp in contact with the said second lead.

8. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end and pins protruding from opposite sides thereof to the lamp at said station and threading one of said leads through the said aperture comprising means for selecting one base from a pile, means for orientating the base so that the pins thereon lie in a predetermined plane, and means for advancing the base toward the lamp to thread one of said leads through the said aperture in the base and properly position said base on the lamp.

9. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end and to the lamp at said station and threading one of said leads through the said aperture comprising an inclined hopper for holding a plurality of bases, a notched wheel mounted in the hopper and supporting the bases, means for indexing the notched wheel to cause the bases to be agitated and fall into the said notches, a plunger smaller in size than the open end of a base mounted below the path of travel of the said notches in said wheel, means for actuating said plunger to move it upward into one of the said notches so as to push a base therefrom if the plug therein is lowermost and to pass into the interior of the base without removing it from the notch if the open end is lowermost, a second plunger located at another position below the path of travel of said notches, means for moving said second plunger upward to push out the bases left in the notched wheel after engagement with the first plunger, and means for advancing the base toward the lamp to thread one of said leads through the aperture in the base and properly position said base on the lamp.

10. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end and pins protruding from opposite sides thereof to the lamp at said station and threading one of said leads through the said aperture comprising an inclined hopper for holding a plurality of bases, a notched wheel mounted in the hopper and supporting the bases, means for indexing the notched wheel to cause the bases to be agitated and fall into the said notches, a plunger smaller in size than the open end of a base mounted below the path of travel of the said notches in said wheel, means for actuating said plunger to move it upward into one of the said notches so as to push a base therefrom if the plug therein is lowermost and to pass into the interior of the base without removing it from the notch if the open end is lowermost, a second plunger located at another position below the path of travel of said notches, means for moving said second plunger upward to push out the bases left in the notched wheel after engagement with the first plunger, means for orientating the base so that the pins thereon lie in a predetermined plane, and means for advancing the base toward the lamp to thread one of said leads through the aperture in the base and properly position said base on the lamp.

11. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means disposed adjacent another station for feeding a base having an apertured insulating plug in one end and pins protruding from opposite sides thereof, a die mounted adjacent to said base feeding means having a V-shaped notch therein and an opening through said notch for receiving a base and having grooves in opposite sides of said opening into which the pins on said base are directed by the sides of said notch to properly orient the base and means for advancing a base through said die toward a lamp to thread one of said leads through the aperture in said base and properly position said base on said lamp.

12. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end and pins protruding from opposite sides thereof to the lamp at said station and threading one of said leads through said aperture comprising an inclined hopper for holding a plurality of bases, a notched wheel mounted in the hopper and supporting the bases, means for indexing said notched wheel to cause the bases to be agitated and fall into said notches, a plunger smaller in size than the open end of a base mounted below the path of travel of the said notches in said wheel, means for actuating said plunger to move it upward into one of the said notches so as to push a base therefrom if the plug therein is lowermost and to pass into the interior of the base without removing it from the notch if the open end is lowermost, a second plunger located at another position below the path of travel of said notches, means for moving said second plunger upward to push out the bases left in the notched wheel after engagement with the first plunger, a die mounted above the said notched wheel and the first plunger having a V-shaped notch therein and an opening through said notch for receiving a base and having grooves in opposite sides of said opening into which the pins on said base are directed by the sides of said notch to properly orient the base and means for advancing a base through said die toward a lamp to thread one of said leads through the aperture in said base and properly position said base on said lamp.

13. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end to the lamp at said station and threading one of said leads through the said aperture comprising an inclined hopper for holding a plurality of bases, a notched wheel mounted in the hopper and supporting the bases, means for indexing said notched wheel to cause the bases to be agitated and fall into the said notches, a plunger smaller in size than the open end of a base mounted below the path of travel of the said notches in said wheel, means for actuating said plunger to move it upward into one of the said notches so as to push a base therefrom if the plug therein is lowermost and to pass into the interior of the base without removing it from the notch if the open end is lowermost, a second plunger located at another position below the path of travel of said notches, means for moving said second plunger upward to push out the bases left in the notched wheel after engagement with the first plunger, a bracket having a channel extending from a position above a notch in said wheel in line with said first plunger to a position above the lamp holder in a head at the base feeding station, means on the bracket at the end of the channel adjacent to said notched wheel for preventing the bases from falling back down out of said channel, and means for removing a base from said channel and advancing it toward the lamp in the head at said base feeding station to thread one of the lamp leads through the aperture in the base and properly position said base on the lamp.

14. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning said leads, means located adjacent another station for feeding a base having an apertured insulating plug in one end to the lamp at said station and threading a lead thereof through the said aperture comprising an inclined hopper for holding a plurality of bases, a notched wheel mounted in said hopper and supporting the bases, means for indexing said notched wheel to cause the bases to be agitated and fall into the said notches, a plunger smaller in size than the open end of a base mounted below the path of travel of the said notches in said wheel, means for actuating said plunger to move it upward into one of the notches so as to push a base therefrom if the plug therein is lowermost and to pass into the interior of the base without removing it from the notch if the open end is lowermost, a second plunger located at another position below the path of travel of said notches, means for moving said second plunger upward to push out the bases left in the notched wheel after engagement with the first plunger, a bracket having a channel extending from a position above a notch in said wheel in line with said first plunger to a position above the lamp holder in a head at said base feeding position, means on the bracket at the end of the channel adjacent to said notched wheel for preventing the bases from falling out of said channel, a feeler mounted on said bracket, means for moving said feeler into the channel in said bracket or against a base therein, means for disconnecting the indexing means for the said notched wheel when a base is engaged by said feeler and the feeding of other bases is not required, and means for removing a base from the said channel and advancing it toward the lamp in the head at said base feeding station to thread one of the lamp leads through the aperture in the base and properly position said base on the lamp.

15. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning the said leads, means located adjacent to a base feeding station for selecting one base from a pile of bases, a bracket having a channel therein extending from said base selecting means to a position adjacent the lamp holder in a head at said base feeding station, means for feeding the selected bases into one end of said channel, a pair of jaws mounted adjacent the other end of said channel, means for actuating said jaws to cause them to grip the endmost base at the said other end of said channel and advance said base toward the lamp in the head at the said base feeding station to thread one of said leads through the aperture in the base and properly position said base on the lamp and means adjacent the said last-mentioned end of said channel for engaging the next to the last base therein to retain the remaining bases in the said channel while the endmost base is being removed by said jaws.

16. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning the said leads, means located at another station for advancing a base having an apertured insulating plug in one end to thread one of the said leads of a lamp at said station through said aperture in the base plug and to position said base properly on said lamp, a pair of co-acting notching dies located at another station, means for actuating said dies to punch a notch in the edge of the open end of said base, a pair of jaws also mounted at said station, and means for actuating said jaws to remove said base from said lamp, carry it into operative relation to the said dies and then replace it on said lamp in such a position that another of said lamp leads extends through the said notch in the rim of said base.

17. A machine of the class described comprising a carrier having a plurality of heads mounted thereon, means for indexing said carrier intermittently to advance the heads from one station to another, a holder on each of said heads for a lamp having leads extending therefrom, means disposed adjacent to the path of said heads at succeeding stations for positioning the said leads so that one of them extends sidewards, means located at another station for advancing a base having an apertured insulating plug in one end to thread one of the said leads through said aperture and position said base properly on the lamp, and transferring means mounted at still another station for transferring a bulb and base to a basing machine, said transferring means comprising a pair of jaws adapted to grip the lead extending through the aperture in the said base, a second pair of jaws adapted to engage the lead extending sideward from the lamp to prevent said lamp and base from turning out of position and means for operating said pairs of jaws at both ends of the transferring movement and for moving the said jaws to transfer the lamp and base.

18. A machine of the class described comprising a carrier having a plurality of heads mounted thereon, means for indexing said carrier intermittently to advance the heads from one station to another, a holder on each of said heads for a lamp having a neck portion with leads extending therefrom, a pair of jaws mounted on each of said heads, means for closing the said jaws on said heads to engage the neck of the bulb therein and hold it in a definite position, means disposed adjacent to the path of said heads for positioning the said lamp leads, means for opening said jaws after operation of said lead positioning means, means located at another station for placing a base over said bulb neck between said pair of jaws, means for again closing said jaws to cause them to this time engage the said base and means at another station for removing said lamp from the head in which it is held when the base is improperly positioned, said last-named means being caused to operate when the said jaws close too far due to their failure to engage the said base.

VICTOR T. UBER.